United States Patent [19]
Martin et al.

[11] Patent Number: 5,328,612
[45] Date of Patent: Jul. 12, 1994

[54] THIMBLE-SHAPED LIQUID FILTER

[75] Inventors: James W. Martin, Rehobeth, Mass.;
Gerard P. Bernadyn, Coventry, R.I.;
Donald L. Gagnon, Pawtucket, R.I.;
Russell A. Swanson, Barrington, R.I.

[73] Assignee: Allied-Signal Inc., Morristown, N.J.

[21] Appl. No.: 976,785

[22] Filed: Nov. 16, 1992

[51] Int. Cl.⁵ .............................................. B01D 27/06
[52] U.S. Cl. ............................... 210/493.2; 210/493.5; 210/497.01
[58] Field of Search ............... 210/493.1, 493.2, 493.5, 210/497.01, 497.2, 508; 55/521

[56] References Cited

U.S. PATENT DOCUMENTS

| | | | |
|---|---|---|---|
| 806,920 | 12/1905 | Rossi | 210/497.3 |
| 1,150,910 | 8/1915 | Warmington | 210/493.1 |
| 1,676,024 | 7/1928 | Hansen | 210/493.1 |
| 1,682,897 | 9/1928 | Fesler | 210/493.1 |
| 1,728,305 | 9/1929 | Raney | 210/493.1 |
| 2,298,980 | 10/1942 | Sloan et al. | 210/493.5 |
| 2,730,241 | 1/1956 | Thomas | 210/493.1 |
| 3,096,281 | 7/1963 | Smith et al. | 210/493.1 |
| 3,368,687 | 2/1968 | Ruschman | 210/493.1 |
| 3,877,903 | 4/1975 | Peterson | 210/493.1 |
| 4,075,107 | 2/1978 | Smith | 210/493.1 |
| 4,151,095 | 4/1979 | Wright | 210/493.5 |
| 4,187,091 | 2/1980 | Durre et al. | 210/493.1 |
| 4,211,543 | 7/1980 | Tokar et al. | 210/493.1 |
| 4,374,026 | 2/1983 | Greutert | 210/493.5 |
| 4,439,321 | 3/1984 | Taki et al. | 210/493.1 |
| 4,652,285 | 3/1987 | Greene | 210/493.1 |
| 4,663,041 | 5/1987 | Miyagi et al. | 210/493.2 |
| 4,957,632 | 9/1990 | Bockstiegel et al. | 210/493.7 |
| 5,128,039 | 7/1992 | Gabrielson | 210/493.2 |

*Primary Examiner*—Matthew O. Savage
*Attorney, Agent, or Firm*—Ken C. Decker; William N. Antonis

[57] ABSTRACT

A liquid filter element includes a circumferentially extending array of pleated filtering material. The end sections of each of the pleats are folded over and crushed together, and are embedded in a plastic plug to form a rigid link extending substantially transversely with respect to the array to thereby strengthen the array against inward radial collapse in response to liquid pressure acting on the array. A process for making the element is disclosed which includes the step of forming a circular array of pleats, applying pressure to the end sections of the pleats to crush the pleats and rigidify them, and then bending the rest of the array about the rigidified portion to form the thimble-shaped filter element.

6 Claims, 3 Drawing Sheets

THIMBLE-SHAPED LIQUID FILTER

This invention relates to a liquid filter element which may be used, for example, to filter the lubricating oil of an internal combustion engine, or may be used to filter the fuel used by the engine.

Liquid filters of the type used to filter the lubricating oil of an internal combustion engine normally consist of a filter element sealed within a metal housing which is secured to the vehicle engine by being "spun-on" a threaded mounted stud provided by the manufacturer of the engine. The filter element usually consists of a cylindrical array of pleated paper. The upper and lower ends of the array are sealed by a sealing material carried by annular end caps which are placed on the upper and lower ends of the media. Flow of oil is normally from the outside of the array to the inside; accordingly, because of the pressure levels involved and the fact that high temperatures are achieved by the lubricating oil, it is necessary to provide a perforated metal centertube to resist inward collapse of the pleats. Of course, each of the end caps, sealant material, and centertube adds cost to the assembly.

The present invention provides a thimble-shaped filter element in which the end sections of the pleats extend inwardly and are rigidified by being crushed together and/or sealed together by a plastic sealant to form a transversely extending, rigidified link that sufficiently strengthens the filter element so that the centertube may be eliminated. Because the rigidified link seals one end of the element, one of the end cap assemblies is eliminated. Accordingly, the cost of the filter element is substantially reduced.

These and other advantages of the present invention become apparent from the following description, with reference to the accompanying drawings, in which.

Figure 1:
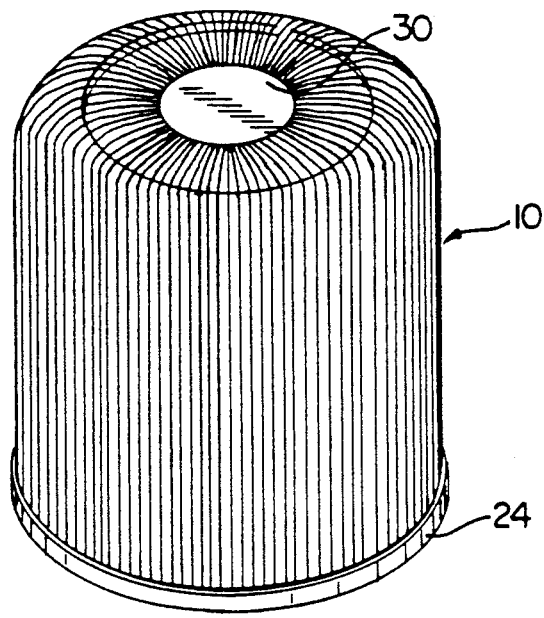
FIG. 1 is a perspective view of a filter element made pursuant to the teachings of the present invention.

Referring now to the drawings, a liquid filter element generally indicated by the numeral 10 consists of a circumferentially extending array of pleated filter media generally indicated by the numeral 12 defined by radially tapering pleats 14. The filtering media 12 may be any of a wide variety of conventional types and is primarily chosen for its filtering characteristics. However, in order to withstand the shaping, forming and fusing operations to form the completed element 10, it is desirable that the filtering media includes a significant proportion of textile fibers over about one inch long and that it be impregnated with a thermally responsive resin so that portions of the media will be fused together when treated as will hereinafter be described. Such resins for treating filtering media are well known to those skilled in the art and form no part of the present invention.

Figure 2:
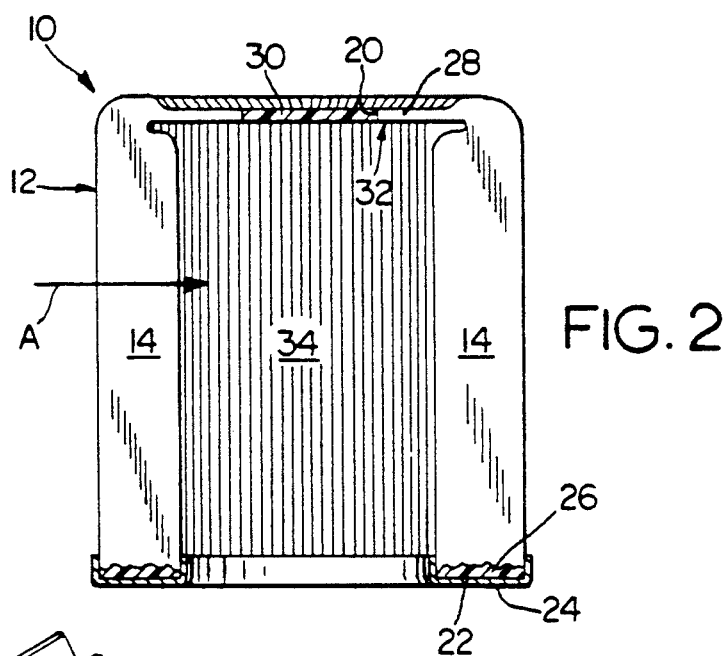
FIG. 2 is a longitudinal cross-sectional view taken through the filter element of FIG. 1.
Figure 3:
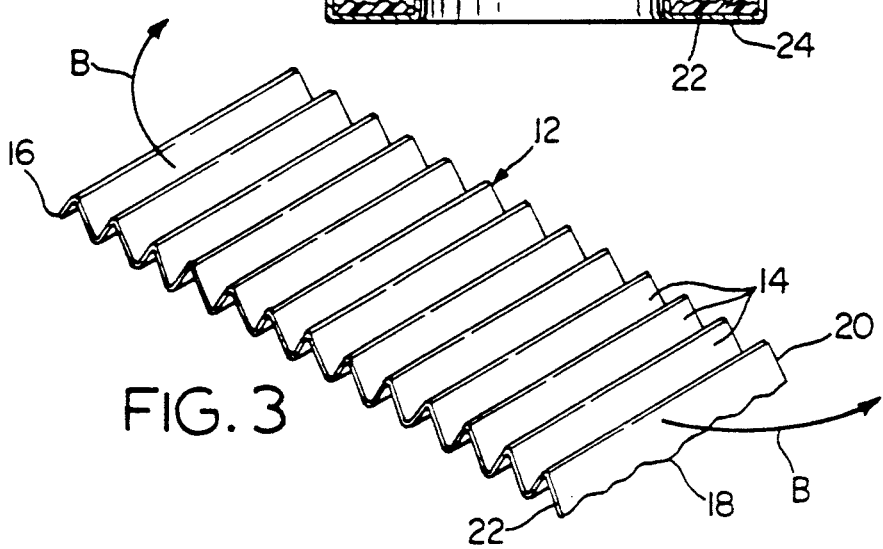
FIG. 3 is a perspective view of a strip of pleated filter media used in the filter of the present invention.
Figure 4:
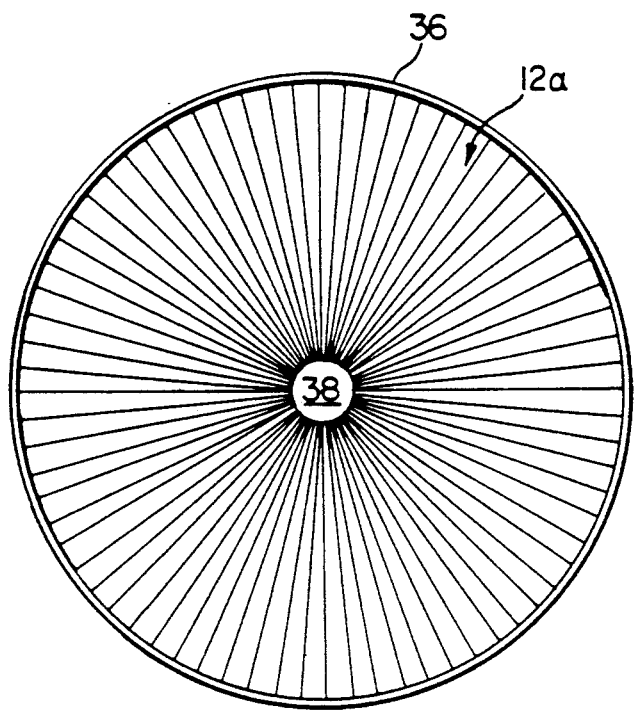
FIGS. 4–10 are schematic illustrations of the process steps used to form the filter element of FIGS. 1 and 2, with the equipment used therein illustrated schematically.

Referring now to FIG. 3, a section of the media 12 after the pleats 14 have been formed, but before the latter has been gathered to form the element 10 as will be hereinafter described, includes edges 16, 18 and pleats 14 defined between ends 20, 22. As most clearly shown in FIG. 2, after the array is formed as will be hereinafter described into the thimble-shaped filter element 10, the ends 22 of the pleats 14 are received within a circumferentially extending end cap 24 which is provided with an appropriate amount of a sealant 26. The end sections 28 of each pleat, which terminate in the end 20, are folded inwardly with respect to the array 12 and are crushed against the end sections of adjacent pleats as will hereinafter be described. Ends 20 are embedded in a plastic plug 30 to form a rigidified link generally indicated by the numeral 32 which extends substantially transversely with respect to the array 12 to thereby strengthen the array against inward radial collapse in response to liquid pressure acting on the array. If the filtering media has sufficient formability and flowability, the end sections 28 themselves may close any opening between the pleats, so that the plug 30 may be omitted. However, the relative prices of filter paper and the plastic from which the plug 30 is made may make it more economical to use the plug 30 rather than an increased amount of filter paper. The link 32, as will hereinafter be described, has been formed and denisified, and the resin therein cured, such that the link 32 is impermeable to the liquid being filtered. The sole function of plug 30 is to close any opening defined by the one end 20 of the pleats 14. The plug may be made of any appropriate deformable sealing material, such as a plastic compound known as Hytrel 5556 ® copolymer, available from the DuPont Corporation. This material is curable to a rigid state by the application of heat, as will hereinafter be described.

In use, the filter element 10 is installed within a metal housing in the same way as a conventional cylindrical filter element is installed in a metal housing. The metal housing is then "spun-on" the mounting stud provided by the manufacturer of the vehicle engine. Oil being filtered is communicated from the outside of the filter element 10 to the inside, as indicated by the arrow A in FIG. 2. The chamber 34 defined within the element 10 is communicated to the outlet opening of the housing (not shown) for the oil to communicate back into the engine.

Figure 5:
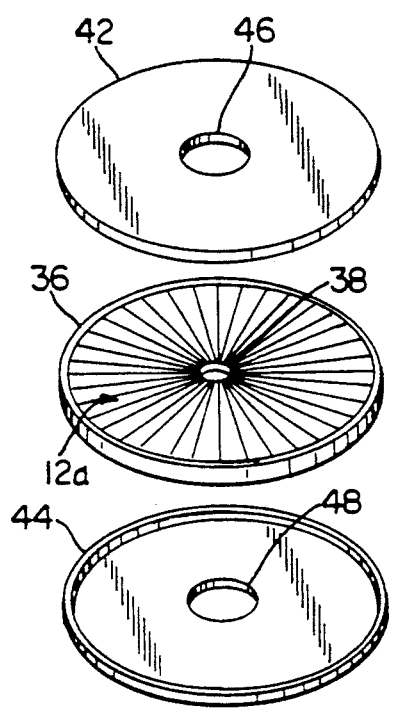

Referring now to FIGS. 3–10, the method of making the element 10 will now be described. Referring to FIG. 3, which illustrates a sheet of pleated filter paper before it has been formed into the element 10, the array 12 is formed into a circle by bringing the opposite edges 16, 18 against one another to form a circular array by moving each of the edges 16, 18 in the direction of the arrows B in FIG. 3. The circular array, indicated by numeral 12a is then placed in a ring shaped die generally indicated by the numeral 36. Depending upon the width of the array 12 (that is, the distance between the pleat ends 20, 22), the center hole 38 defined by the circular array 12a will vary for a ring die 36 in a given diameter. Referring now to FIG. 5, the ring die 36 is capped with top and bottom plates 42 and 44, which pilot on the edge of the ring die 36 to assure that the central openings 46 and 48 of the plates 42, 44 are concentric with the opening 38 in the circular array 12a. The diameter of the openings 46, 48 will be somewhat larger than the central opening 38.

Figure 6:
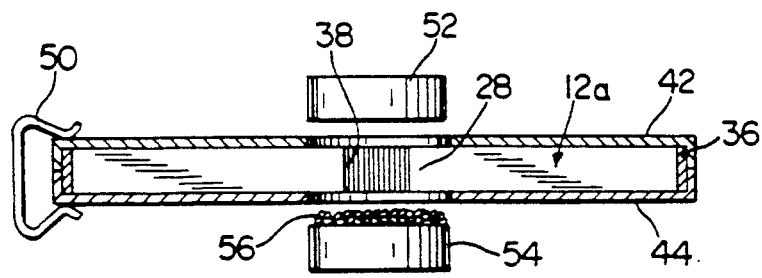

FIG. 6 is a cross-sectional view taken through the completed mold assembly illustrated in FIG. 5. The plates 42, 44 and ring die 36 are clamped together lightly by a clamping member illustrated schematically at 50. The completed assembly is then placed in a press having an upper mold 52 and a lower mold 54. The molds 52, 54 are preheated to the range of 375° F. to 460° F., depending upon the media and the resin used to impregnate the media. The molds 52, 54 are then forced against the end section 28 of the media that projects into the central openings 46, 48 defined by the plates 42 and 44. If a plug 30 is to be used, pellets of the aforementioned plastic material, indicated generally at 56, are placed on the bottom of the mold 54. The optimal amount of the plastic or other deformable material is the number of pellets necessary to cover the surface are of the center hole 38 and to embed the ends 12 of the pleats in the material. Pressure is then applied to the top and bottom molds 52, 54 in an amount sufficient to crush the ends of the pleats together and also to form the plastic plug 30 from the plastic material 56. The maximum pressure used is usually between 1500 and 1600 pounds load. The pressure is held for a dwell period of approximate 10 seconds and then the molds are released and the media 12a is removed from the dies. The formed media is now in the condition illustrated in FIG. 7. It will be noted that the end portions 28 of the pleats 14 are crushed together, and are embedded in the plastic material comprising the plug 30, if the plug 30 is used. If the center opening is small enough, as discussed above, the plug 30 may not be necessary, and the end sections 28 of the pleats themselves may be crushed together during the pressing operation described above to completely close the center opening 38. Sufficient pressure is applied to the end sections 28 during the molding process illustrated in FIG. 6 to completely cure the resin impregnated in the filtering media, thereby rending the end sections 28 rigid and densifying them to the point that they are impermeable to liquid. The molded end section 28, with the plug 30, thereby form a rigid link, while permitting the rest of the pleats 14 to remain relatively flexible.

Figure 7:
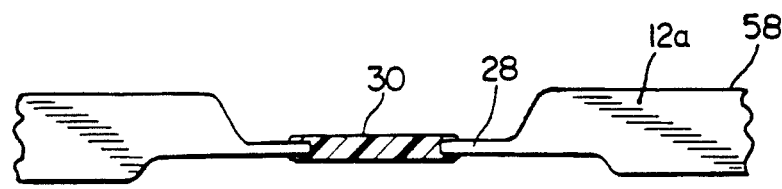
Figure 8:
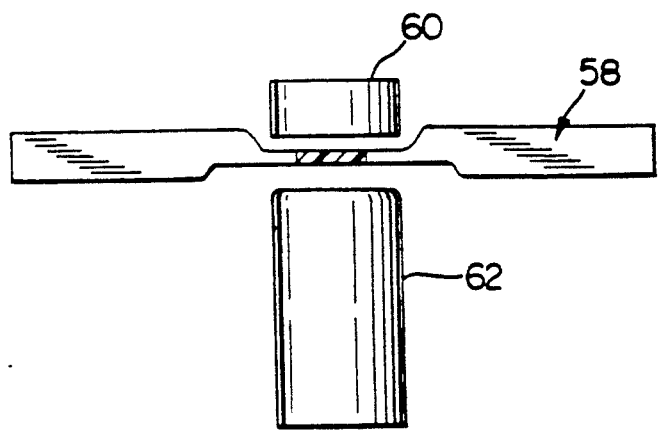
Figure 9:
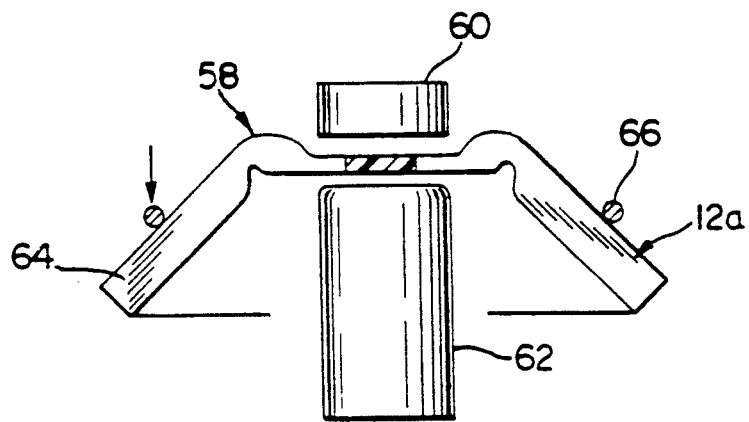
Figure 10:
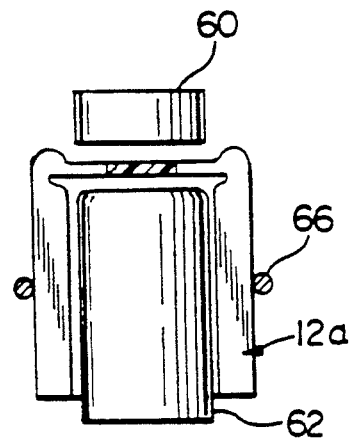

The preform generally indicated by the numeral 58 in FIG. 7, which is formed by the pressing operation illustrated in FIG. 6, is then transferred to another press having dies 60, 62 in FIG. 8. The die 60 is identical to the die 52 used in the pressing operation of FIG. 6. The die 62 is a cylinder having a diameter and length equal to the desired diameter and length of the central cavity 34. The preform 58 is clamped between the dies 60 and 62 and downward pressure is applied to the radially outwardly extending portion 64 of the preform 58 by lowering a series of progressively smaller rings 66 against the portion 64 to force it to conform to the cylinder 62, as indicated in FIG. 9. When forming, it is desirable to heat the preform 58 to a temperature sufficient to soften the media to permit forming. After the completed element is removed from the press, the element will expand while cooling unless it is heated in an oven to a temperature which, depending upon the resin used, is of the order of 325° F., for a time period, again depending upon the resin and other materials used, of the order of 3 minutes. The lower end cap 24 can then be installed to complete the element 10.

I claim:

1. Liquid filter element comprising a circumferentially extending array of pleated filtering media defining radially tapering pleats, said array defining a longitudinal axis, each of said pleats having opposite ends, each of said pleats being divided into an end section between one end of the pleat and a point between the ends of the pleats and an end portion between said point and the other end of said pleat, said media being impregnated with a thermally cured resin, the end section of each of said pleats being folded inwardly with respect to said array and being crushed together to form a flat disc extending perpendicularly to said axis, said resin being cured to secure the end sections of adjacent pleats together to form said disc, said disc forming a rigidified link to strengthen said array against radial inward collapse in response to liquid pressure acting on said array.

2. Liquid filter element as claimed in claim 1, wherein said one ends of said pleats cooperate with one another to define an opening coaxial with said array, and a plug closing said opening.

3. Liquid filter element as claimed in claim 1, wherein a circumferentially extending, annular end cap assembly carrying sealant material circumscribes the other ends of said pleats and seals the latter against liquid bypass around said other ends of the pleats.

4. Liquid filter element comprising a circumferentially extending array of pleated filtering media defining radially tapering pleats, each of said pleats having opposite ends, each of said pleats being divided into an end section between one end of the pleat and a point between the ends of the pleats and an end portion between said point and the other end of said pleat, the end section of each of said pleats being folded inwardly with respect to said array and being secured to the end sections of adjacent pleats to form a rigidified link extending substantially transversely with respect to said array to thereby strengthen said array against radial inward collapse in response to liquid pressure acting on said array, said end sections of the pleats being crushed against one another to form said link, said media being impregnated with a thermally responsive resin, the resin in said end sections being cured to secure each end section to adjacent end sections to thereby form said rigidified link, said one ends of said pleats cooperating with one another to define an opening coaxial with said array, a plug closing said opening, said plug being a deformable, sealing material that is cured into a rigid state, the one end of said pleats being embedded into said plug.

5. Liquid filter element comprising a circumferentially extending array of pleated filtering media defining radially tapering pleats, each of said pleats having opposite ends, each of said pleats being divided into an end section between one end of the pleat and a point between the ends of the pleats and an end portion between said point and the other end of said pleat, the end section of each of said pleats being folded inwardly with respect to said array and being secured to the end sections of adjacent pleats to form a rigidified link extending substantially transversely with respect to said array to thereby strengthen said array against radial inward collapse in response to liquid pressure acting on said array, said one ends of said pleats cooperating with one another to define an opening coaxial with said array, a plug closing said opening, said plug being a deformable, sealing material that is cured into a rigid state, the one end of said pleats being embedded into said plug.

6. Liquid filter element as claimed in claim 5, wherein a circumferentially extending, annular end cap assembly carrying sealant material circumscribes the other ends of said pleats and seals the latter against liquid bypass around said other ends of the pleats.

* * * * *